United States Patent
Sibrai (10) Patent No.: US 7,154,733 B2
(45) Date of Patent: Dec. 26, 2006

(54) LOW COST SQUIB DRIVER FOR AIRBAG APPLICATION

(75) Inventor: Andreas Sibrai, Krottendorf (AT)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 218 days.

(21) Appl. No.: 10/830,157

(22) Filed: Apr. 22, 2004

(65) Prior Publication Data

US 2005/0225925 A1    Oct. 13, 2005

(30) Foreign Application Priority Data

Mar. 30, 2004   (EP)   .................................. 04392016

(51) Int. Cl.
*F23Q 5/00*   (2006.01)
*F23Q 7/00*   (2006.01)

(52) U.S. Cl. ..................................... 361/248

(58) Field of Classification Search ................ 361/247, 361/248

See application file for complete search history.

(56) References Cited

U.S. PATENT DOCUMENTS

| | | | | |
|---|---|---|---|---|
| 2,874,956 | A | | 2/1959 | La Belle ....................... 267/18 |
| 4,829,899 | A | * | 5/1989 | Wiker et al. ................. 102/206 |
| 5,194,755 | A | | 3/1993 | Rhee et al. ................. 307/10.1 |
| 5,289,058 | A | * | 2/1994 | Okamoto ..................... 327/334 |
| 5,459,449 | A | | 10/1995 | Ravas, Jr. et al. ........... 340/438 |
| 5,675,242 | A | | 10/1997 | Nakano ....................... 323/312 |
| 5,734,317 | A | * | 3/1998 | Bennett et al. ............. 340/436 |
| 5,977,651 | A | * | 11/1999 | Ueda et al. ................. 307/10.1 |
| 6,456,915 | B1 | * | 9/2002 | Fendt et al. ................... 701/45 |
| 6,787,858 | B1 | * | 9/2004 | Zitouni et al. .............. 257/372 |
| 2001/0006309 | A1 | | 7/2001 | Ueno et al. ................. 307/10.1 |
| 2001/0009337 | A1 | | 7/2001 | Ueno et al. ................. 307/10.1 |
| 2002/0050826 | A1 | | 5/2002 | Boran et al. ................. 324/525 |
| 2002/0125950 | A1 | * | 9/2002 | Abe ........................... 330/253 |

FOREIGN PATENT DOCUMENTS

| | | | |
|---|---|---|---|
| DE | 10147884 A | | 4/2003 |
| WO | WO 02/26529 A | | 4/2002 |

* cited by examiner

*Primary Examiner*—Brian Sircus
*Assistant Examiner*—Ann T. Hoang
(74) *Attorney, Agent, or Firm*—Saile Ackerman LLC; Stephen B. Ackerman (57) ABSTRACT

A circuit and a method are given, to realize a very efficient driver device for igniters or squibs as used e.g. in airbag applications. Special attention has been turned to include secure and always reliable operating features into the device and at the same time to reach for a low-cost implementation with modern integrated circuit technologies. Controlled firing operation and sophisticated diagnostic mechanisms are realized. These design features have been acquired by use of current mirror circuit principles for the switching devices where appropriate and with special regard to production cost. Current trimming and limitation to secure values are part of the solution.

36 Claims, 6 Drawing Sheets

*Provide a means for a Control and Test Unit for a Squib Driver circuit, containing a Firing Control (FC) unit and a Diagnostic and Online Test (DOT) unit with input and output connections for - inter alia - an electrical Safing Sensor, a Fuel Cut-Off During Collision operation and a Diagnostic Lamp Driver signal, and further additionally containing measuring or sensing input signals and control output signals* — 502

*Provide for said Squib Driver circuit means for connecting an external main power supply via a mechanical Safing Sensor and means for connecting to ground* — 504

*Provide for said Squib Driver circuit external means for said power supply using a single charge pump circuit for storing said main supply energy within an external storage capacitor as AVS voltage* — 505

*Provide for said Squib Driver circuit connection means for connecting an external igniter device or squib to a first connection pin named high-side connection and to a second connection pin named low-side connection* — 507

*Provide a first internal means for switching operations of said external igniter device or squib on its high-side connection point, named high-side switching device* — 510

*Provide a second internal means for switching operations of said external igniter device or squib on its low-side connection point, named low-side switching device* — 511

LOW COST SQUIB DRIVER FOR AIRBAG APPLICATION

RELATED PATENT APPLICATION

This application is related to U.S. patent application Ser. No. 10/828,889, filed concurrently, and assigned to the same assignee as the present invention. Title: "Squib Driver for Airbag Application"

BACKGROUND OF THE INVENTION (1) Field of the Invention

The present invention relates in general to electronic circuits as used within Supplemental Inflatable Restraint (SIR) systems for automotive vehicles and the like, and, more specifically, to semiconductor integrated driver circuits which are employed in such automobile airbag systems for deploying airbags using igniters or squibs; and including a firing control section guaranteeing secure operation under any circumstances and also including circuit diagnostics for testing the proper operation capabilities of the drivers that supply the electrical energy to ignite the squibs.

(2) Description of the Prior Art

The main components of Supplemental Inflatable Restraint (SIR) systems for automotive vehicles and generally used as passenger protection systems in motor vehicles include an inflatable textile bag, named airbag, a propellant source (made e.g. from sodium azide pellets), an igniter or squib to initiate burning of the propellant source by means of a firing circuit driving said squib for causing inflation of the airbag. The squib is a detonator wire used for example to ignite the explosive charge that inflates the airbag in the automobile. The squib is a low resistance conductive wire with multiple coatings of an explosive material. At impact during an automobile accident, a large current flows through the squib, heats the wire, and ignites the explosive layers. This initial explosion sets off a secondary charge that inflates the airbag to protect the occupants. The airbag, propellant, and igniter are by default contained in an airbag module (e.g., within a steering wheel for a driver airbag). The crash or safing sensor can be packaged separately or may be contained within the electronic control module.

Alongside also necessary as another main component is a deployment circuit having at least one accelerometer as crash sensor, sensitive to vehicle motion, especially deceleration, and containing an electronic control module for determining when to deploy the airbag and sending a deployment pulse to the igniter, normally using a microprocessor system monitoring the accelerometer output for evaluating the severity of a crash to determine whether to deploy the airbag.

This control module performs basic self-diagnostic monitoring of the SIR system each time the system is turned on (e.g., every time a vehicle is started). Any potential performance problems are identified and a warning light e.g. is illuminated on the console, so that the automobile driver knows that the system needs to be serviced. The vehicle battery voltage or ignition system voltage empowering these deployment and firing circuits will, by the way, subsequently be called Airbag Voltage Supply (AVS) voltage. This voltage is generated from the battery supply and is present even in case of a battery disconnection, in order to safely supply the airbag system. The control circuit and the firing circuit are in general and to a large extent embodied with a specialized microprocessor system core on integrated circuit chips for the airbag deployment functionality, altogether called an Airbag Controller and Squib Driver. (In all currently known applications, the needed microprocessor is located on a different asic chip as the squib driver. $1^{st}$ asic: processor and sensor interface; $2^{nd}$ asic: squib driver together with diagnostics (and devices for power supply generation)). In any case an external harness leads to the squib at the site of the airbag, or in the case the vehicle is equipped with more airbags, this harness connects the squibs of each airbag to the squib driver chips. It is conceivable that eventually some portion of the harness might become damaged, i.e. short to ground (GND) or even to the AVS voltage. To forestall the possibility that such inadvertent electrical connection to the firing circuit might cause deployment of the airbag or disable the whole system, it is desirable to continuously monitor the system to detect any such event. It is common practice to perform diagnostic monitoring of the electrical connection of the squib elements, squib resistances, and electrical leakage or isolation in the squib circuits, among other tests. It is already known to diagnose a short of the firing circuit by feeding a small test current through the squib and through a biasing resistor to ground. The resulting bias voltage will depend on the current and if there are no shorts to the firing circuit the resulting test voltage will be at a prescribed value. To assure this, the test current has to be carefully controlled. Where, for example, if the current is provided by a current source on an integrated circuit, the circuit must be trimmed during manufacture to assure the correct current output. Then the test voltage is sampled by an A/D converter e.g. and fed to the microprocessor where it is monitored to detect a low value indicative of shorting to ground or a high value indicative of shorting to supply voltage. Thus the monitoring circuit in the automobile continuously checks the squib resistance and reports values outside the acceptable range as a warning.

Preferred prior art circuits obeying to automotive industry regulations do not allow a direct galvanic connection of the squib to the supply voltages—neither to the AVS voltage nor to GND voltage with possible firing current flowing—during normal operation of the vehicle, i.e. not firing the squib, and therefore include two separate switches on every side of a squib. This means one high-side switch connects the squib to AVS voltage and another low-side switch connects the squib to GND voltage, thus the deployment of a squib is only initiated if these two independent switches of the firing loop are both closed; the firing loop formed by the vehicle battery between AVS and GND on one side and with said high-side switch, said squib to be fired and said low-side switch on the other side. Currently said squib driver switches are implemented using NPN, NMOS or DMOS transistors, which are controlled as switches by appropriate driver circuits. Due to supply voltage variations and deviations from the normal squib resistance from about 2 Ohms the current through the switches may vary between approximately 2 A and 4.5 A. For integrated squib power transistor switches however the current flowing through these switching devices must be limited to approximately 3 A, therefore it has to be measured and limited during said firing operation and additionally the transistors must be forced to reduce their on-resistance to avoid excessive power dissipation, which could lead to a premature destruction of said semiconductor switching devices. The current practice of sensing this current with resistors causes excess voltage drop that in consequence enlarges the unwanted power dissipation within the integrated power circuit. This disadvantage poses a major problem for that sort of circuits.

Another consequence of the aforementioned automotive industry requirements is the measurement of the isolation of the squib against AVS and GND, and also the determination of the squib resistance, which has to be performed during normal operation of the vehicle. Normal operation means that the squib is not firing. These measuring operations should be periodically performed by applying repeatedly cycling resistance measurements during normal operations of the vehicle. In one aspect, prior art solutions provide a method of testing a high-side driver and a low-side driver in an airbag squib circuit. The airbag squib circuit includes a squib element coupled between the high-side driver and the low-side driver. The high-side driver controllably provides a high-side voltage to one side of the squib element and the low-side driver controllably provides a low-side voltage to the other side of the squib element. Resistance of the squib element is tested for a resistance value laying within a predetermined resistance range. Current leakage associated with said squib element is tested to determine whether it is over a leakage threshold. An intermediate voltage from a weak power supply is supplied to a test-point in the airbag squib circuit between the high-side driver and the low-side driver. One of the drivers is turned on while keeping the other one of the drivers off. Voltage at the test-point is continuously compared with a predetermined voltage range, which includes the intermediate voltage. This one driver is turned off in response to the voltage at the test-point being outside the predetermined voltage range, thereby detecting that this one driver is operating properly. If the voltage at the test-point remains in the predetermined voltage range for a predetermined time period, then this one driver is turned off and an indication is made that this one driver has failed.

Unless there is a failure, the other driver is then turned on while keeping the one driver off. A voltage at the test-point is continuously compared with the predetermined voltage range. The other driver is turned off in response to the voltage at the test-point being outside the predetermined voltage range, thereby detecting that the other driver is operating properly. If the voltage at the test-point remains in the predetermined voltage range for the predetermined time period, then the other driver is turned off and an indication is made that the other driver has failed.

In daily use of these circuits in vehicles and especially under all the existing environmental conditions appearing on earth during operation of an automobile another major problem is the degradation of the devices during lifetime and therefore a multitude of techniques and methods for their implementations has been specified in the past.

The main problem hereby is due to the fact, that in most cases the known prior art solutions are very elaborate and complicated when all the requirements as established by the automotive industry have to be met, thereby giving practical realizations leading to very costly devices.

It is therefore a challenge for the designer of such devices and circuits to achieve a high-quality and also low-cost solution. Several prior art inventions referring to such solutions describe related methods, devices and circuits, as well as technologies.

U.S. Pat. No. 5,459,449 (to Ravas et al.) describes a method and an apparatus for diagnosing shorts in a SIR system, whereby airbags are deployed by firing circuits each containing a squib in series with a common control switch, and a control containing an accelerometer and a microprocessor for operating the switch to deploy the airbags. To diagnose shorts, a current source feeds a trickle current through each squib and a current limited voltage regulator across the switch passes the combined trickle currents to ground. The microprocessor senses the voltage across the switch via an A/D converter. That voltage goes low for a short to ground and high for a short to battery voltage.

U.S. Pat. No. 5,675,242 (to Nakano) discloses a semiconductor integrated circuit in which a power field effect transistor (MOSFET) supplies a squib of automobile airbag systems with load current. The power MOSFET provides a squib with the load current; a load current signal which outputs from shunt resistor is provided to an operational amplifier consisting of multiple transistors with a negative feedback signal, so that the load current to be supplied to the squib is restricted. The negative feedback operation is interrupted by a load current function interruption signal. A circuit, which consists of two current mirror circuits, composed of multiple transistors and a constant current source supplies the operational amplifier with constant current to interrupt the feedback operation.

U.S. Patent Application 2001/006309 (to Ueno et al.) shows an activating device for a vehicle passenger protection system in a vehicle, whereby an erroneous activating operation caused by improper operation of a microcomputer or electrical noise is prevented even though electronic switches are used to operate a squib. A microcomputer has output ports connected to first through third driving circuits controlling first through third electronic switching devices connected in series with a squib for deploying a passenger protection device. A timer circuit is connected to the first switching device by way of a prohibiting circuit provided as a hardware unit independent of the microcomputer.

Although these papers describe methods close to the field of the invention they differ in essential features from the method and especially the circuit introduced here.

SUMMARY OF THE INVENTION

A principal object of the present invention is to realize a very efficient driver device for the firing of igniters or squibs in form of very manufacturable integrated circuits at low cost.

Another principal object of the present invention is to provide an effective and secure method for operating said driver device for igniters or squibs implementable with the help of integrated circuits.

Also another principal object of the present invention is to always secure a controlled firing operation of the igniters or squibs by means of electronic switching devices with controlled current and voltage, i.e. with controlled energy.

Further a principal object of the present invention is to include a secure and continuous surveillance of the igniter or squib devices as well as the electronic switching devices and at the same time guaranteeing, that under no circumstances an unintentional firing operation can occur.

Also an object of the present invention is to include secure and reliable operating features into said driver device and at the same time to reach for a low-cost realization with modern integrated circuit technologies.

Further another object of the present invention is to economize the floor space of the chip layout needed for said switching devices, therefore using for the high-side switching device a single FET-switch, thus avoiding a large current mirror for high voltages normally consuming a rather large chip area.

Also further an object of the present invention is the inclusion of diagnostic test mechanisms into the circuit and its operation, which includes voltage, current and resistance measurements serving as surveillance of said electronic switches and said squib.

Another further object of the present invention is to combine needed current limitations and said onsite diagnostic tests in one operating function within said electronic switches by an implementation using current mirrors as control and/or switching devices.

Further another object of the present invention is to economize the floor space of the chip layout needed for said current mirrors.

Also another further object of the present invention is to avoid additional voltage drop due to said current measurement within said current mirror, thus avoiding additional power loss.

A further object of the present invention is the implementation of said current limiting regulation feature realized without control loop, thus avoiding possible instability of regulation loops.

Also an object of the present invention is thereby to establish an especially adapted method for said resistance measurement of said electronic switch as isolation measurement.

Also another object of the present invention is to resolve with said adapted method for said measuring of said electronic switch resistance also said resistance measurement of said squib.

A still further object of the present invention is to reduce the power consumption of the circuit by realizing inherent appropriate design features, such as trimming and limiting the maximum squib current to its absolutely necessary minimum for a secure firing operation.

Also an object of the invention is therefore to reduce the cost of the system by reducing the size of the external energy storing capacitor, made possible due to said current trimming and limiting.

Another further object of the present invention is to reduce the cost of manufacturing by implementing the circuit as a monolithic integrated circuit in low cost CMOS technology.

Another still further object of the present invention is to reduce cost by effectively minimizing the number of expensive components.

In accordance with the objects of this invention, a new method for the controlled operation and secure firing of igniters or squibs is described, capable of driving the necessary switching devices within a circuit branch connecting said squib via a high-side electronic switch to a power source and via a low-side electronic switch to circuit ground, incorporating separate power supply parts for high voltage and low voltage domains and equipped with elaborate intrinsic diagnostic and online testing features for circuit protection and operation securing purposes, altogether named Squib Driver circuit, comprising the following steps of providing a means for a Control and Test Unit for said Squib Driver circuit, containing a Firing Control (FC) unit and a Diagnostic and Online Test (DOT) unit with input and output connections for—inter alia—an electrical Safing Sensor, a Fuel Cut-Off During Collision operation and a Diagnostic Lamp Driver signal, and further additionally containing measuring or sensing input signals and control output signals; providing for said Squib Driver circuit means for connecting an external main power supply via a mechanical Safing Sensor and means for connecting to ground; providing for said Squib Driver circuit external means for said power supply using a single charge pump circuit for storing said main supply energy within an external storage capacitor as so called AVS voltage; providing for said Squib Driver circuit connection means for connecting an external igniter device or squib to a first connection pin named high-side connection and to a second connection pin named low-side connection; providing a first internal means for switching operations of said external igniter device or squib on its high-side connection point, named high-side switching device; providing a second internal means for switching operations of said external igniter device or squib on its low-side connection point, named low-side switching device; providing a first internal means for driving said internal high-side switching device, named High-Side Driver (HSD) circuit; providing other internal means for supplying multiple driver currents to said internal low-side switching device using controllable and switchable current source circuits; providing means for connection of said measuring or sensing input signals from said high-side and low-side switching devices to said Control and Test Unit; providing means for connection of said control output signals from said Control and Test Unit to said controllable and switchable current source circuits for said low-side switching device; implementing said high-side switching device as a single NMOS FET switch transistor, thus economizing chip space otherwise needed for implementing more complex structures for higher voltages; implementing said low-side switching device with the help of a pair of NMOS transistors in current mirror configuration; implementing said high-side switch driver circuit with the help of an integrated HSD circuit, consisting of two anti-phased driven current mirror differential switching amplifier NMOS&PMOS stages each with PMOS output booster circuit and both driving one PMOS output driver stage biased by an internal current source; implementing for said low-side switching device said controlled pair of switchable current sources as drivers, whereby the one current source defines the normal diagnostic and test operations and the other current source the firing operation; initiating a Basic Function Test Cycle for said Squib Driver circuit during power on of said Squib Driver circuit, testing regular functionality of said internal driver circuits and switches and said external igniter device or squib; starting, in normal operation mode, the Diagnostic and Test Cycle for continuous surveillance of prescribed isolation and resistance values i.e. of the regular functioning of the system; testing for isolation values of the high-side and low-side switching devices versus supply voltage and ground; measuring appropriate test voltages at the squib and said high-side and low-side switching devices in the switched squib branch with the help of given diagnostic currents; calculating the resistance of the squib and said high-side and low-side switching devices in the switched squib branch; evaluating said measured and calculated values and compare to the prescribed and for a regular operation required and defined values; activating in case of failure an alarming signal; calculating with the help of said voltage and resistance values secure firing current values for said high-side and said low-side switching devices, thus trimming, i.e. setting-up said controlled driving currents to their operational necessary minimum, and thus limiting said main supply energy stored within said external storage capacitor to an optimum; continuing the Diagnostic and Test Cycle from its starting point above during normal operation of the Squib Driver circuit; and firing the squib in case of emergency by switching on at the same time, both the high-side and the low-side switching devices and whilst observing given current limitations with the help of said controlled driving currents.

Further in accordance with the objects of this invention, a circuit, implementing said new method is achieved, capable of realizing a driver device for secure and reliable firing of an igniter or squib, connecting said squib via a high-side electronic switch to a power source and via a low-side electronic switch to circuit ground, incorporating separate power supply parts for high voltage and low voltage domains and equipped with elaborate intrinsic diagnostic and online testing features for circuit protection and operation securing purposes, comprising the following means: a means for control of said firing, said diagnostic and said online testing; a means for said high-side switching of said squib to said power source; a means for said low-side switching of said squib to said circuit ground; a means for said high voltage domain power supply; a means for said low voltage domain power supply; a means for secured supply of electrical energy to said means for said high-side switching derived from said high voltage domain; a means for secured supply of electrical energy to said means for said low-side switching derived from said low voltage domain; a means for driving said high-side switching means for said squib controlled by said means for control of firing, diagnostic and online testing and supplying drive current to said high-side switching means either for the case of said diagnostic and online testing operations or for the case of said firing operation; and a means for connecting said high-side switching means and said low-side switching means to said means for control of firing, diagnostic and online testing in order to execute said diagnostic measurement and online testing whereby in said case of diagnostic and online testing operations a switchable and controllable current flow is initiated in conjunction with appropriate voltage measurements and resistance evaluations thereby strictly observing that no firing condition for said squib are allowed to occur and whereby in said case of firing operation a secure firing of said squib is always guaranteed.

BRIEF DESCRIPTION OF THE DRAWINGS

In the accompanying drawings forming a material part of this description, the details of the invention are shown.

DESCRIPTION OF THE PREFERRED EMBODIMENTS

The preferred embodiments disclose a novel optimized circuit conception for a squib driver using modern integrated digital circuits and an exemplary circuit thereto.

The description of the preferred embodiments of the invention is subdivided into two parts; first an overall description of the whole implementation and its conceptional design is given and second a detailed description of an incorporated driver circuit part is presented, which is called High-Side Driver (HSD) and forming an essential part of the invention.

The approach for driving squibs within SIR systems implemented here is to some extent already known and has therefore been described in detail in the prior art description section above. Its in-depth comprehension is indeed a prerequisite for the understanding of the following new circuit approaches and design principles.

Important and valid are the respective automotive industry regulations, which do not allow during normal operation of the vehicle for a direct galvanic connection of the squib to either of the both voltages—neither to the Airbag Voltage Supply (AVS) voltage nor to GND voltage—or a closed FET switch contacting at the same time of both low resistance switches together; normal operation signifying thereby not firing the squib. Therefore standard design includes two separate switches on every side of a squib in a "vice-versa locking" operation mode, which is also effective in every possible testing situation. This means one high-side switch connects the squib to AVS voltage and another low-side switch connects the squib to GND voltage, thus the deployment of a squib is only initiated if these two independent switches of the firing loop are closed; the firing loop formed by the vehicle battery between AVS and GND on one side and with said high-side switch, said squib to be fired and said low-side switch on the other side.

Currently said squib driver switches are implemented using NPN, NMOS or DMOS transistors, which are controlled as semiconductor switches by appropriate driver circuits. Due to variations in the squib resistance from normally about 2 Ohms and the drain-source-on resistance of the two needed switches, the current through the switches may vary between approximately 1.5 A and 4.5 A. For integrated squib power transistor switches the current flowing through these semiconductor switching devices must be limited to approximately 3 A, and by reducing this current to a safe but nevertheless reliable minimum with respect to firing the squib, the needed external energy storage capacitance $C_{store}$ can also be reduced in size, which is very important for economizing the overall system costs. Therefore this current has to be measured and controlled during said firing operation and the transistors must be forced to reduce their on-resistance to avoid excessive power dissipation, which could lead to a premature destruction of said switching devices. The current practice of sensing this current with resistors causes an additional voltage drop, which in consequence enlarges the unwanted power dissipation within the integrated power circuit. This disadvantage poses a major problem for these sorts of circuits.

Another important consequence of the aforementioned requirements by the automotive industry is a virtually incessant measuring of the isolation of the squib against AVS and GND, and also a quasi permanent determination of the squib resistance, which has to be performed during normal operation of the vehicle and can be appropriately solved by using periodically cycling measurement methods. Occurring faults can therefore be recognized almost immediately and will be signalized to the operator and/or be processed adequately by the security system of the vehicle. When performing electrical testing involving the squibs, care must be taken to avoid application of any current to a squib that could cause an inadvertent deployment of the airbag. Due to the cost of replacing an airbag module and the loss of supplemental protection until replacement occurs, diagnostic monitoring should not increase the chances of an inadvertent deployment. Therefore a very desirable test to be able to perform is a driver circuit test in which a squib driver circuit can be activated in a test mode without igniting the squib. Such a test has to verify that said semiconductor switches in series with the squib element itself would conduct as intended during an actual deployment event. However, such a test is problematic since the activation of each of these switches partially completes the deployment circuit. If certain other faults exist, or if the switch activation is not implemented properly, unintended deployments could occur. In a squib activating driver device for a passenger protection system in a vehicle an erroneous activating operation caused by improper operation of a microprocessor or any other component—or caused even by electrical noise—has to be prevented although electronic semiconductor switches are used to operate the squib.

Figure 1:
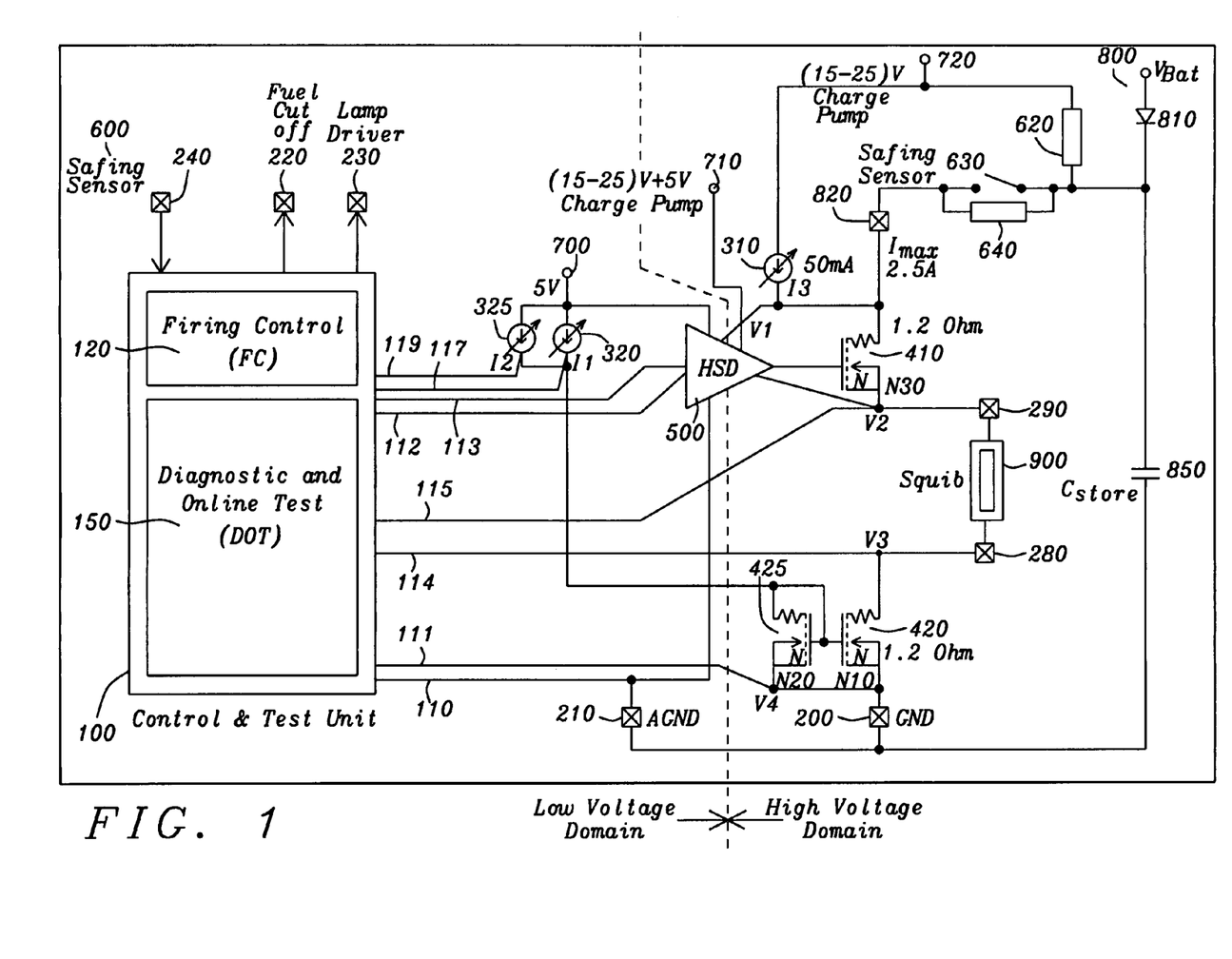
FIG. 1 shows the essential components for the preferred embodiment of the present invention i.e. a circuit diagram of the complete squib driver arrangement. The circuit diagram illustrates the essential circuit blocks—among other things the firing control and diagnostic testing circuit, High-Side Driver (HSD), the switch FETs and the squib—and their interconnections, all realizable with a variety of modern monolithic integrated-circuit technologies.

Referring now to FIG. 1, the preferred embodiment of the circuit diagram implementing the complete squib driver arrangement of the present invention is illustrated. The essential functional components comprise the Firing Control 120 (FC) and Diagnostic & Online Testing 150 (DOT) circuit within control and test unit 100, all the input, output and ground pins of the circuit (items 200 ... 290), the igniter or squib (item 900), diverse current sources for driver switch diagnostics and firing $I_1$, $I_2$ and $I_3$ (items 320, 325, 310), $I_1$ and $I_2$ thereby controlled via control signal lines (items 117 and 119), one high-side driver NMOS-FET $N_{30}$ switch (item 410) for squib 900 and driven by a High-Side Driver (HSD, item 500) device, and two low-side driver NMOS-FETs $N_{10}$ and $N_{20}$ (items 420 and 425) in current mirror configuration and serving as low-side driver switch for squib 900. Also depicted are several external power supplying components being inputs from charge pumps (items 710, 720) or being the extra energy storing capacitor $C_{store}$ (item 850) serving as storage load for said charge pump 720 whereby the charge pump voltage $V_{cpAVS}$ (for item 720) as seen over $C_{store}$ (850) is always the main power supply source of the airbag application. This extra energy storage is especially of importance through its boosting and buffering in an emergency case, when the battery of the vehicle is not working any more i.e. not delivering enough power for secure ignition of the squib in case of an accident. Also shown is the power input voltage $V_{Bat}$ via connector from the vehicle battery 800 together with its reverse battery protection diode 810, whereby this voltage $V_{Bat}$ is initially charging said capacitor $C_{store}$ (850) during the power-up sequence. After this the charge pump 720 is charging this connection node 820 (diode 810-capacitor 850) up to a voltage of 15–25V and thus disconnecting $V_{Bat}$ by said diode 810 from said node 820, now delivering the Airbag Voltage Supply (AVS) voltage. That means that the power source Airbag Voltage Supply (AVS) for the driver circuit is independent from the battery of the car, where $V_{Bat}$ (800) is the battery voltage. The charge-pump-AVS output node (720) delivers 15–25V for power supply, this voltage is named $V_{cpAVS}$. This node is also charging $C_{store}$ (850) and $C_{store}$ is delivering the energy for firing the squib. The node charge-pump-Gate (710) requires the voltage $V_{cpG}$, with a voltage of additional 5V higher than $V_{cpAVS}$, in order to deliver the needed voltage to the gate of the transistor $N_{30}$ (410). Summarizing this: in the high voltage domain the voltage $V_{cpAVS}$ (720) is generated out of the battery voltage $V_{Bat}$ (800) and thus establishing the power source AVS for the airbag system. Out of $V_{cpAVS}$ (720), the following supplies are generated: voltage $V_{cpG}$ for charge-pump-Gate node (710), which is 5V higher as $V_{cpAVS}$ and thus also in the high voltage domain and a separate 5V supply at node (700), delivering power to the low voltage domain. Further shown in FIG. 1 are the safing sensor components for either electrical 600 (input pin 240) or mechanical type (items 620, 630 and 640) devices.

Summarizing the essential operational features of the circuit we find, that the squib driver circuit contains a high-side FET switch $N_{30}$ (410) which connects one connector pin of the squib (900) via the safing sensor to the Airbag Voltage Supply ($V_{cpAVS}$; 720) and a low side switch $N_{10}$ (420) which connects the second connector pin of the squib (900) to GND (200). The two ground nodes GND and AGND are separated because a large current will run when the squib is fired. This causes a big voltage shift, which could the lead, the sensor side cicuits as well as the digital circuitry to malfunctions. The ground nodes are connected together outside of the package, which makes the internal AGND stable. The regular resistance value of the squib (900) is about 2 Ohm. At normal operation of the vehicle (i.e. not firing the squib) the squib is not allowed to have a connection neither to $V_{cpAVS}$ (720) nor to GND (200). Therefore regularly measuring during normal operation the isolation values of the squib (900) vs. $V_{cpAVS}$ (720) and vs. GND (200) is a requirement. The healthy condition of the squib (900) is additionally supervised by regularly measuring the resistance of the squib (900). The diagnostic current values during these diagnostic measurements must be limited to currents lying in the range of 50 mA sufficiently far away from the values of the firing current. The current value for firing the squib (900) must be supplied with values between 2 A and about 3 A. Having the squib fired by said low-side current mirror $N_{10}$–$N_{20}$ (420–425; operating as a closing FET switch) and said high-side FET switch $N_{30}$ (410) closed, all operating in the AVS voltage (15–25V; (max. 40V; i.e. able to tolerate a 40V rise at load dump)) domain, all the diagnostic operations for these FET switches (410 and 420–425) and for the squib (900) can be controlled and measured by control signals completely derived from the 5V (or 3.3V) low-voltage domain, only the squib branch being supplied from the AVS high-voltage domain; thus easily fulfilling the operating demands established by security requirements.

Still with the help of FIG. 1 looking now somewhat closer to the diagnostic functions of the circuit of the invention during normal operation, we find that in diagnostic mode for the squib (900), which is controlled by the DOT circuit block (150), the squib (900) is powered by the AVS voltage $V_{cpAVS}$ (720) with a maximum current limited to 50 mA. The voltage sensing signals measured are $V_1$, $V_2$, $V_3$, and $V_4$ fed into the DOT (150) circuit by lines 112, 115, 114 and 111, referenced to GND 110. Switching on the switch FET $N_{30}$ (410) with a limited current from the source 13 (310), the two voltages $V_1$ (112) and $V_2$ (115), and thus the voltage drop $V_1/V_2$ can be measured. With this a short to GND can be detected. In case of a short the squib (900) cannot be fired because the measurement current is limited and too small for firing the squib (900). Switching on the current mirror FET $N_{10}$ (425) with a limited current from the source $I_2$ (325), the voltage drop $V_3/V_4$ (114/111) can be measured. With this a short to AVS can be detected. In case of a short, again the squib (900) cannot be fired because the measurement current is limited and too small for firing the squib (900). Activating the current source FET $N_{10}$ (420) and the switch FET $N_{30}$ (410), the voltage drop $V_2/V_3$ (115/114) of the squib and the serial resistance of the squib can be measured. With 50 mA into 2 Ohms we have a 100 mV voltage drop for a working squib. The current is however limited to 50 mA by the current source (310), so in the last case maximally 50 mA are running over the squib.

Describing now the safing operation of the circuit of the invention—i.e. firing the squib (900)—implies that current source $I_1$ (325) controlled by the firing control signal (117) from circuit block FC (120) injects a defined current to the current mirror $N_{10}$–$N_{20}$ (420–425). So $N_{10}$ (420) will connect the lower side of the squib (900) to GND unless the current exceeds the maximum mirrored current. The high-side switch $N_{30}$ (410) is controlled via the HSD (500) device shown, which is described later with the help of FIG. 2. The gate of transistor $N_{30}$ (410) is forced to raise its potential 5V higher than $V_{cpAVS}$ by an additional charge pump, as described above and located in the power generations block which is not described in this invention.

In case of emergency during a car accident, i.e. when the battery of the vehicle may be already out of order, the energy already pumped by said charge pump into capacitor $C_{store}$ (850) during normal operations and stored within said capacitor as AVS voltage $V_{cpAVS}$ has to be sufficient for said firing of the squib (900) and to supply the needed driver circuit parts with energy for the triggering during said safing operation, whereby the capacitor $C_{store}$ (850) is a very expensive part of the airbag system. By trimming the maximum current through the squib, thus obtaining a reduction of the current to a safe minimum, the capacitor can be reduced in value to save cost. Said trimming and limiting of the maximum squib current therefore helps for a low-cost solution: the capacitance value of capacitor $C_{store}$ (850) can be kept as small as possible, thus allowing to assemble the system with cheaper capacitor components, saving production costs.

Figure 2:
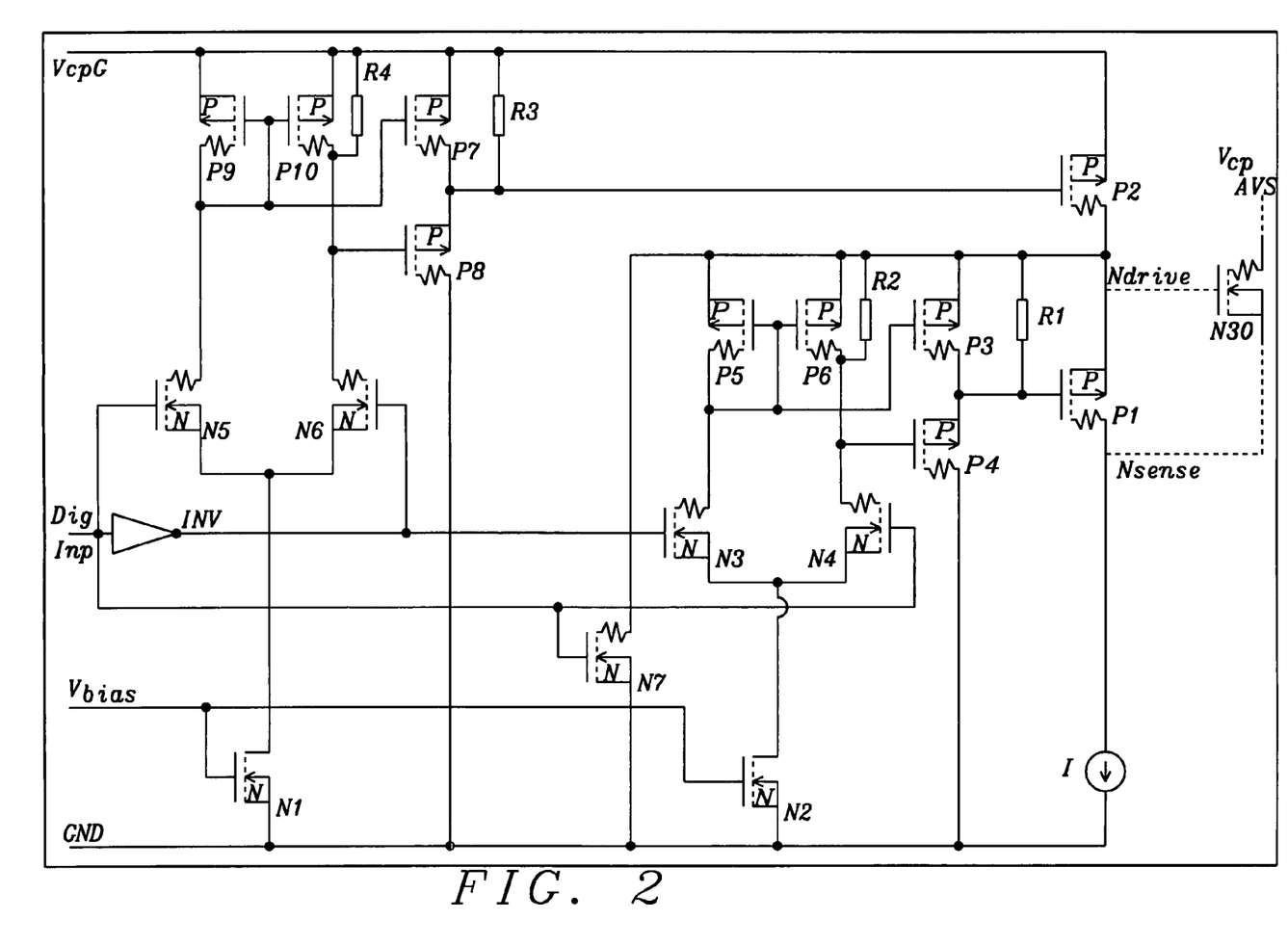
FIG. 2 depicts in form of a circuit schematic an exemplary realization of the integrated HSD circuit within the implementation of the invention according to FIG. 1.
Figure 3A:
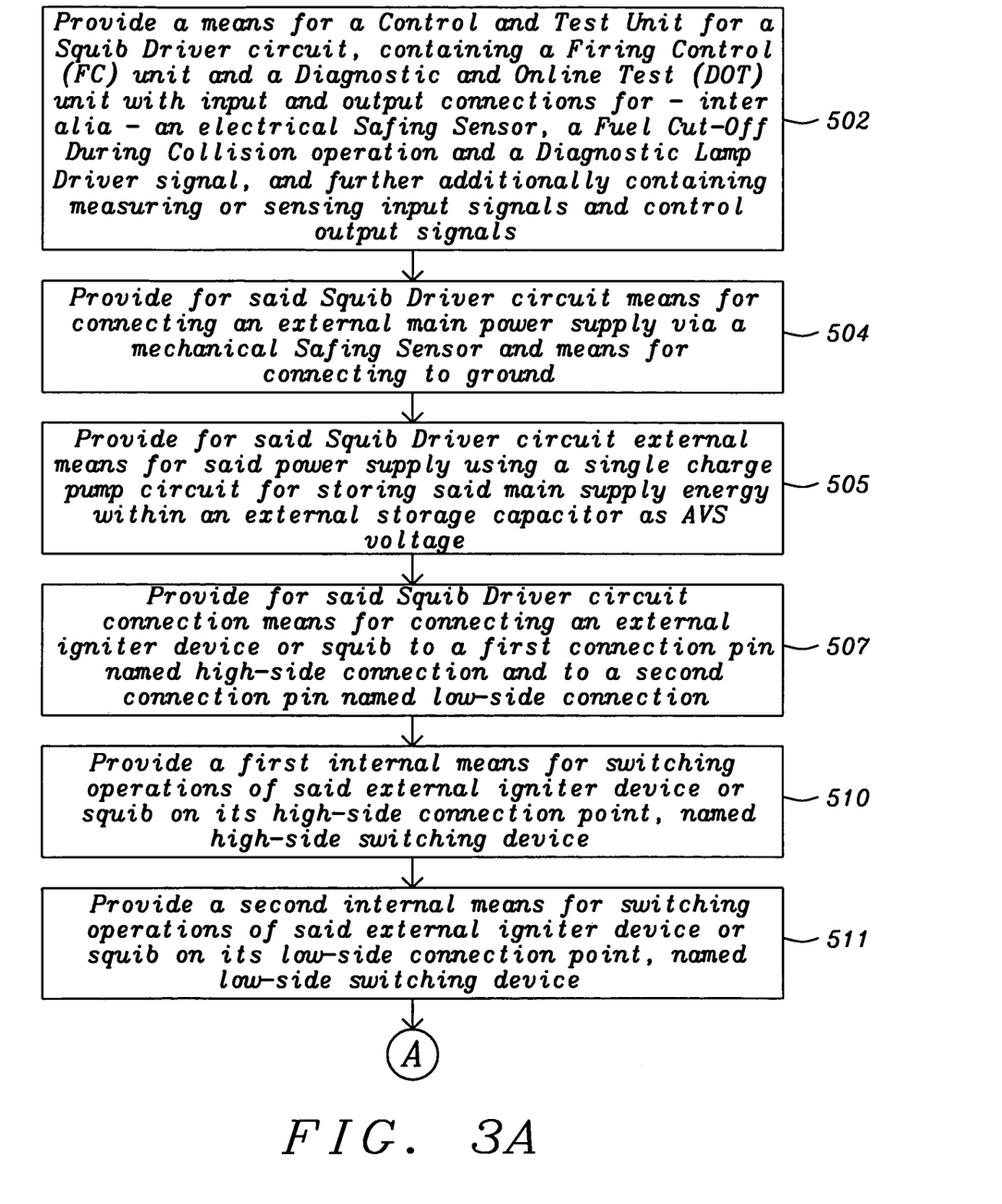
FIGS. 3A–3D describe with the help of a flow diagram the method for operating a squib driver implemented with an electrical circuit as shown in FIGS. 1 & 2 for example.
Figure 3B:
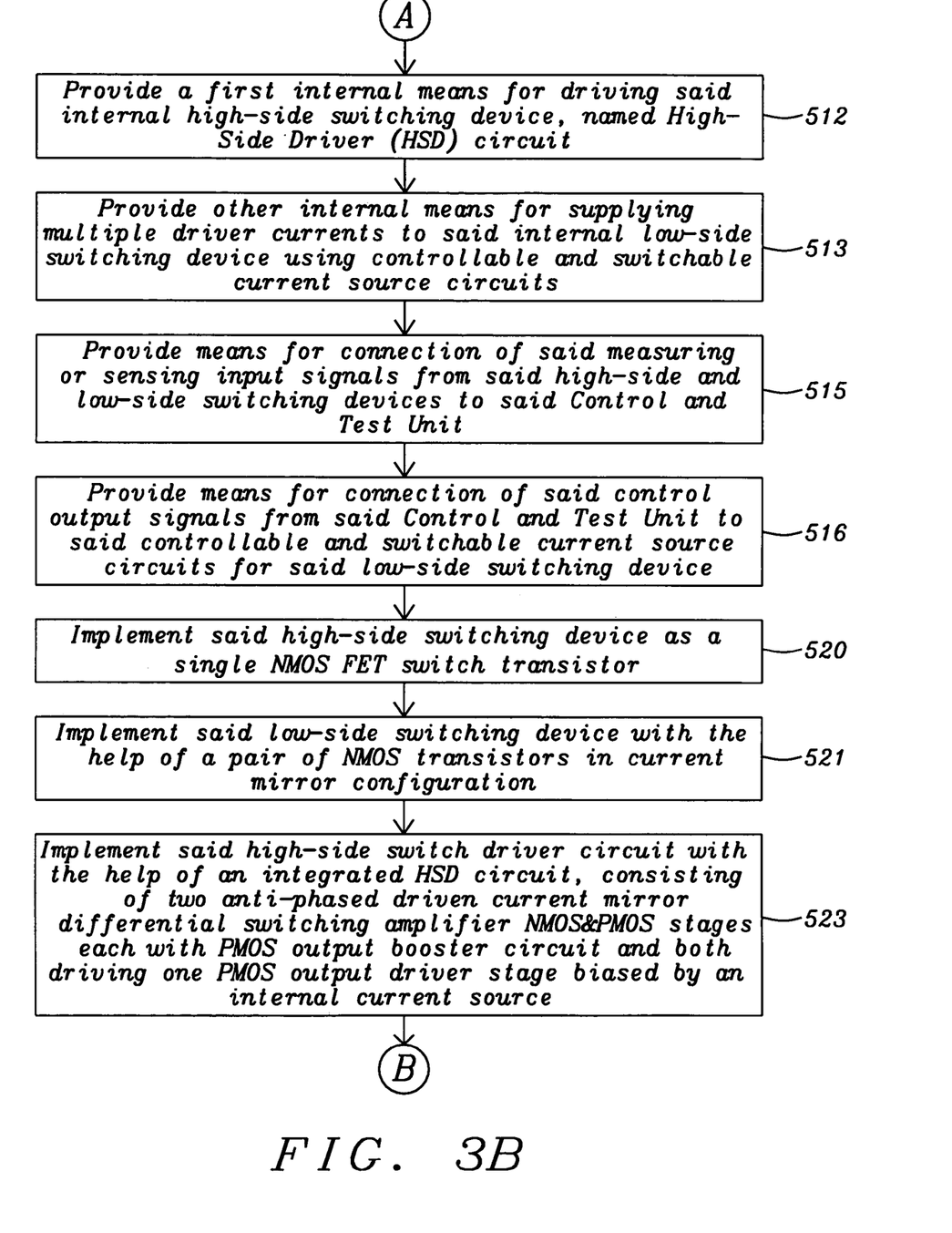
Figure 3C:
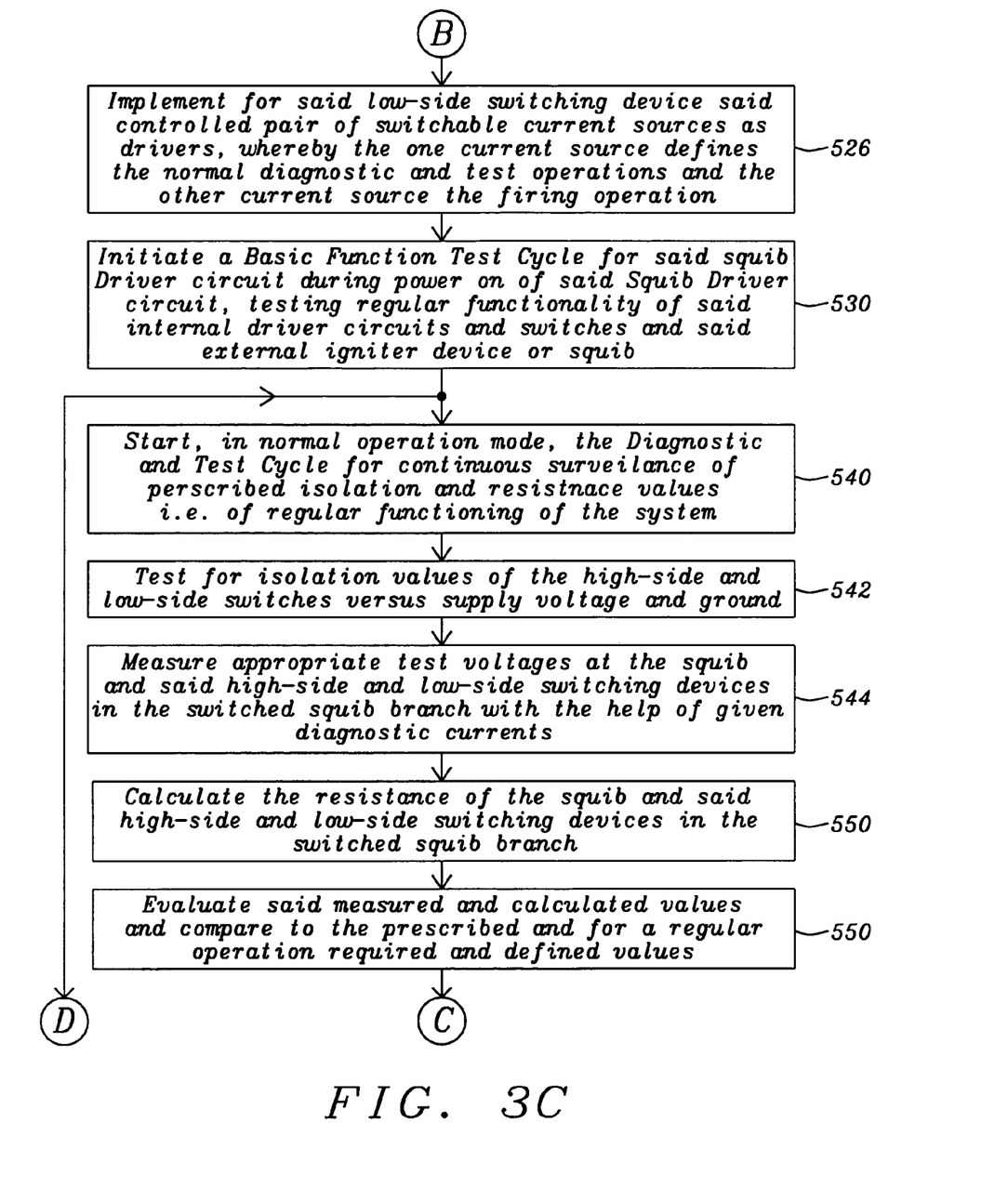
Figure 3D:
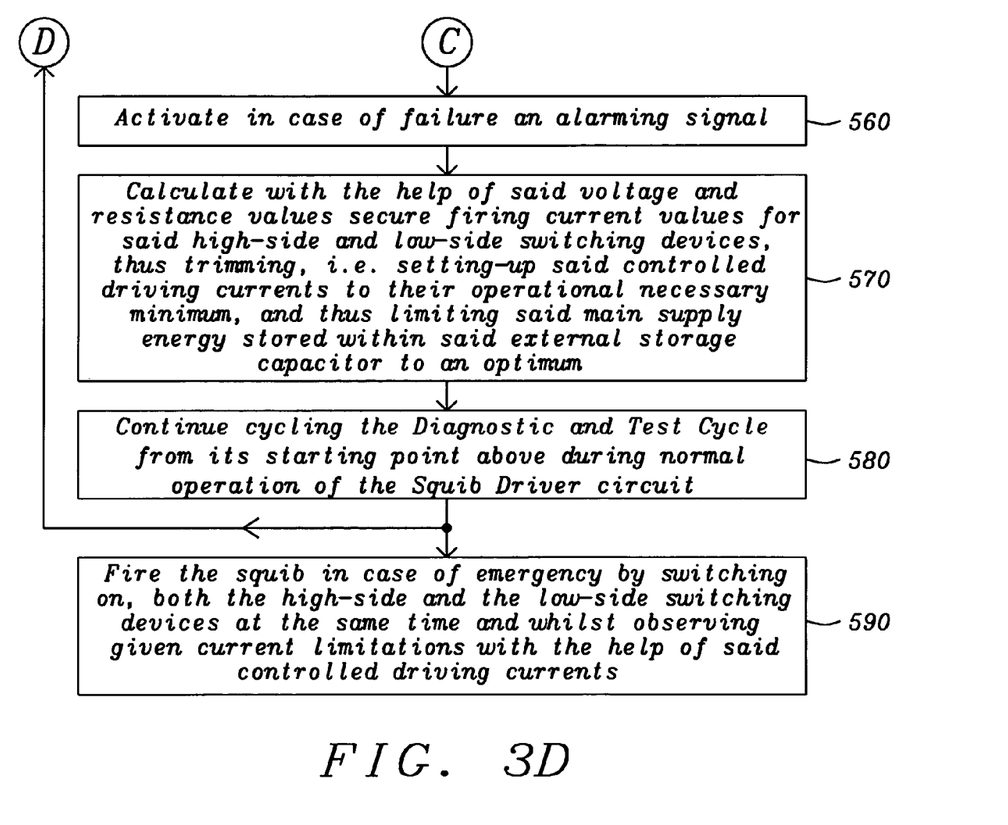

Referring now to the circuit schematic of FIG. 2 an exemplary realization of the integrated HSD (500) circuit controlling MOSFET $N_{30}$ (410) within the implementation of the invention according to FIG. 1 is described in some detail. Essentially included are multiple FET transistors of NMOS type ($N_1$ to $N_7$), multiple FET transistors of PMOS type ($P_1$ to $P_{10}$), a digital inverter circuit (INV) for the digital input signal DigInp, a current source I and some additional integrated resistors $R_1 \ldots R_4$. The external connection pins are used as input for signal DigInp, connections to supply voltages $V_{bias}$, $V_{cpG}$ and GND and the output connections for node signals $N_{drive}$ and $N_{sense}$. The high-side MOSFET switch e.g. $N_{30}$ (item 410 from FIG. 1; here shown dashed) is controlled via said driver device HSD (500) as shown, via said connection nodes and lines (also drawn dashed) and designated $N_{drive}$ and $N_{sense}$. Both transistors $P_1$ and $P_2$ are controlled the same way, so only the functioning of one control circuit is described; ($N_2$, $N_3$, $N_4$, $P_3$, $P_4$, $P_5$, $P_6$, $R_1$, $R_2$ have the same function as $N_1$, $N_5$, $N_6$, $P_7$, $P_8$, $P_9$, $P_{10}$, $R_3$, $R_4$). The differential pair of transistors $N_3$–$N_4$ that is used as a switch (current steering) is switching the current generated by $N_2$ either to transistor $P_5$ that acts as a diode or to transistor $P_6$. If the current is steered through $N_3$, the gate-source voltage at $P_5$ induces a current at transistor $P_3$. Because $N_4$ carries no current the gate of $P_4$ reaches the voltage of node $N_{drive}$, consequently transistor $P_4$ becomes non-conductive. This forces transistor $P_1$ to be also non-conductive. The nodes $N_{drive}$ and $N_{sense}$ are thus high impedance connected. Having transistor $N_4$ conductive, $N_3$ delivers no current and there is no current mirrored via $P_5$ to $P_6$ and also not to $P_3$. The current through $N_4$ causes a voltage drop over resistor $R_2$, connecting to the gate of $P_4$. This gate of $P_4$, which is connected to this node, opens then transistor $P_4$ and forces a current rise through resistor $R_1$ until the gate-source voltage of $P_4$ is limiting the current, thus generating a constant voltage, which switches on $P_1$. The current source $I_1$ serves to compensate for the process and temperature dependencies of $P_4$ to get a stable voltage of 5V over $R_1$. $P_1$ shorts the gate-source ($N_{drive}$-$N_{sense}$) of transistor $N_{30}$ that gets $N_{30}$ into high impedance state. At this moment transistor $N_7$ is conductive to ensure that the voltage potential at node $N_{drive}$ is always following the voltage potential at $N_{sense}$. The very same control functions are used to control the comparable transistor $P_2$. A transistor with a function like $N_7$ is not necessitated because the supply voltage for this comparable structure is always connected to $V_{cpG}$. For an integrated circuits realization of this structure preferably a symmetrical NMOS or a symmetrical DMOS process technology is needed.

Referring now to FIGS. 3A–3D, the method for operating a squib driver circuit implemented using electrical circuit schematics as shown for example in FIGS. 1 & 2 is described in some detail with the help of a flow diagram for every essential step.

Steps 502 to 516 list all the necessary means for the implementation of said method, whereby the first step 502 provides a means for a Control and Test Unit for a Squib Driver circuit, containing a Firing Control (FC) unit and a Diagnostic and Online Test (DOT) unit with input and output connections for—inter alia—an electrical Safing Sensor, a Fuel Cut-Off During Collision operation and a Diagnostic Lamp Driver signal, and further additionally containing measuring or sensing input signals and control output signals and step 504 provides for said Squib Driver circuit means for connecting an external main power supply via a mechanical Safing Sensor and means for connecting to ground, in step 505 for said Squib Driver circuit external means are provided for said power supply using a single charge pump circuit for storing said main supply energy within an external storage capacitor as AVS voltage. Step 507 further provides for said Squib Driver circuit connection means for connecting an external igniter device or squib to a first connection pin named high-side connection and to a second connection pin named low-side connection and steps 510 and 511 provide a first internal means for switching operations of said external igniter device or squib on its high-side connection point, named high-side switching device and a second internal means for switching operations of said external igniter device or squib on its low-side connection point, named low-side switching device. With step 512 and step 513 another internal means for driving said internal high-side switching device, named High-Side Driver (HSD) circuit and again another internal means for supplying multiple driver currents to said internal low-side switching device using controllable and switchable current source circuits are provided. Step 515 provides means for connecting of said measuring or sensing input signals from said high-side and low-side switching devices to said Control and Test Unit and finally step 516 provides means for connecting of said control output signals from said Control and Test Unit to said controllable and switchable current source circuits for said low-side switching device.

Starting with step 520 the implementation of said high-side switching device as a single NMOS FET switch transistor is described, in step 521 implementing said low-side switching device with the help of a pair of NMOS transistors in current mirror configuration follows, together with step 523 implementing said high-side switch driver circuit with the help of an integrated HSD circuit, consisting of two anti-phased driven current mirror differential switching amplifier NMOS&PMOS stages each with PMOS output booster circuit and both driving one PMOS output driver stage biased by an internal current source. Step 526 implements for said low-side switching device said controlled pair of switchable current sources as drivers, whereby the one current source defines the normal diagnostic and test operations and the other current source the firing operation.

In step 530 the normal operation of the circuit begins by initiating a Basic Function Test Cycle for said Squib Driver circuit during power on of said Squib Driver circuit, testing regular functionality of said internal driver circuits and switches and said external igniter device or squib, and step 540 starts, still in normal operation mode, the Diagnostic and Test Cycle for continuous surveillance of prescribed isolation and resistance values i.e. of the regular functioning of the system. With step 542 a test for isolation values of the high-side and low-side switching devices versus supply voltage and ground is made, then step 544 measures appropriate test voltages at the squib and said high-side and low-side switching devices in the switched squib branch with the help of given diagnostic currents, step 550 then calculates the resistance of the squib and said high-side and low-side switching devices in the switched squib branch, and in step 552 the evaluation of said measured and calculated values and comparison to the prescribed and for a regular operation required and defined values is made, activating in case of failure an alarming signal at step 560, all these are steps in normal operation mode. Another normal mode step 570 calculates with the help of said voltage and resistance values secure firing current values for said high-side and low-side switching devices, thus trimming, i.e. setting-up said controlled driving currents to their operational necessary minimum, and thus limiting said main supply energy stored within said external storage capacitor to an optimum and so continuing the Diagnostic and Test Cycle from its starting point above during normal operation of the Squib Driver circuit during step 580. Normal operation ends with step 590, firing the squib in case of emergency by switching on, both the high-side and the low-side switching devices at the same time and whilst observing given current limitations with the help of said controlled driving currents.

As shown in the preferred embodiments and evaluated by circuit analysis, the novel circuits and methods provide an effective and manufacturable alternative to the prior art.

While the invention has been particularly shown and described with reference to the preferred embodiments thereof, it will be understood by those skilled in the art that various changes in form and details may be made without departing from the spirit and scope of the invention.

What is claimed is:

1. A circuit, realizing a driver device for secure and reliable firing of an igniter or squib, connecting said squib via a high-side electronic switch to a power source and via a low-side electronic switch to circuit ground, incorporating separate power supply parts for high voltage and low voltage domains and equipped with elaborate intrinsic diagnostics and online testing features for circuit protection and operation securing purposes, comprising:

a means for control of said firing, said diagnostics, and said online testing having a safing sensor signal input pin, four pins for voltage sense input signals, two pins for one pair of current control output signals, one pin for a driver control output signal and a ground pin;

a means for said high-side switching of said squib to said power source performing high-side switching transistor functions for said firing, for said diagnostics, and for said online testing;

a means for said low-side switching of said squib to said circuit ground performing low-side switching transistor functions for said firing, for said diagnostics, and for said online testing;

a means for providing said high voltage domain power supply;

a means for providing said low voltage domain power supply;

a means for secured supply of electrical energy to said means for said high-side switching derived from said high voltage domain;

a means for steered supply of currents to said means for said low-side switching derived from said low voltage domain and controlled by said pair of current control output signals;

a means for driving said high-side switching means for said squib controlled by said means for control of firing, diagnostic and online testing and supplying drive current to said high-side switching means either for the case of said diagnostic and online testing operations or for the case of said firing operation; and a means for connecting said high-side switching means and said low-side switching means to said means for control of firing, diagnostic and online testing in order to execute said diagnostic measurement and online testing by said four voltage sense input signals whereby in said case of diagnostic and online testing operations a switchable and controllable current flow is initiated in conjunction with appropriate voltage measurements and resistance evaluations thereby strictly observing that no firing condition for said squib is allowed to occur and whereby in case of said firing operation a secure firing of said squib is always guaranteed.

2. The circuit according to claim 1 wherein said means for said high-side switching of said squib to said power source connects to one side of said squib and said means for said low-side switching of said squib to said circuit ground connects to the other side of said squib, thus forming a switchable squib firing branch between said power source and said circuit ground.

3. The circuit according to claim 1 wherein said means for control of said firing, said diagnostic and said online testing is subdivided into a means for control of said firing and a means for said diagnostic and online testing.

4. The circuit according to claim 1 wherein said means for said high-side switching of said squib to said power source is realized as a controllable electronic switch.

5. The circuit according to claim 4 wherein said controllable electronic switch consists of one Field Effect Transistor (FET).

6. The circuit according to claim 5 wherein said FET is of the NMOS type manufactured in CMOS technology.

7. The circuit according to claim 1 wherein said means for said low-side switching of said squib to said circuit ground is implemented using a controllable electronic switch in current mirror configuration.

8. The circuit according to claim 7 wherein said current mirror configuration consists of two FETs.

9. The circuit according to claim 8 wherein said FETs are of the NMOS type manufactured in CMOS technology.

10. The circuit according to claim 1 wherein said means for providing said high voltage domain power supply include generators and batteries from a vehicle as primary source with a voltage range of 15 V to 40V, and derived there-from separate secondary power sources implemented as charge pump devices operating in the same voltage range as said primary source.

11. The circuit according to claim 10 wherein said means for providing said high voltage domain power supply also includes a controlled current source for said high-side switching device.

12. The circuit according to claim 1 wherein said means for providing said low voltage domain power supply consist of separate power sources derived from generators and batteries from a vehicle as primary source with a voltage range of 15 V to 40V and operating within a reduced low voltage range of 3.3 V to 5V.

13. The circuit according to claim 12 wherein said means for providing low voltage domain power supply also includes controlled current sources.

14. The circuit according to claim 1 wherein said means for secured supply of electrical energy to said means for said high-side switching derived from said high voltage domain consists of a charge pump feeding a controlled current source.

15. The circuit according to claim 1 wherein said means for steered supply of currents to said low-side switching means derived from said low voltage domain consists of said one pair of controlled current sources fed by voltages out of said low voltage domain for controlled current switching between different currents for current limiting and diagnostic testing purposes respectively.

16. The circuit according to claim 15 wherein one current source of said pair of controlled current sources is used in case of said diagnostic and online testing operations and the other current source is used in case of said firing operation and each current source is being controlled by a separate case related current control input and whereby as current output from said pair of controlled current sources one common output is formed.

17. The circuit according to claim 1 wherein said means for driving said high-side switching means for said squib consists of an integrated High Side Driver (HSD) circuit implemented in CMOS technology.

18. The circuit according to claim 17 wherein said integrated High Side Driver (HSD) circuit comprises multiple FET transistors of NMOS type, multiple FET transistors of PMOS type, a digital inverter circuit for an input signal fed in from said means for control of said firing, diagnostic and online testing, a current source, and some additional integrated resistors, and whereby external connection pins are used by said input signal, and for connections to supply voltages and GND and for another two output connections for the internally generated driving and sensing node signals connecting to said high-side switching means.

19. The circuit according to claim 1 wherein said means for connecting said high-side switching means and said low-side switching means to said means for control of firing, diagnostic and online testing comprises on one hand output control signal lines leading to said means for driving said high-side switching means and leading to said means for secured supply of electrical energy to said means for said low-side switching derived from said low voltage domain and on the other hand input measurement signal lines from said high-side switching means of said squib and from said low-side switching means, as well as power supply and ground connections.

20. The circuit, according to claim 1 whereby into said means for driving said high-side switching means and into said means for said high-side switching of said squib to said power source are combined together: firstly said high-side switching transistor functions for controlled firing operation and for onsite test diagnostics, secondly said controlled firing operation with current limitation and thirdly said onsite test diagnostics.

21. The circuit, according to claim 1 whereby into said means for said low-side switching of said squib to said circuit ground are combined together: firstly said low-side switching transistor functions for controlled firing operation and for onsite test diagnostics, secondly said controlled firing operation with current limitation and thirdly said onsite test diagnostics.

22. A circuit, included in a driver device for squibs, containing a control and test unit as well as low-side and high-side electronic FET switches, and operating therein as High Side Driver (HSD) device with integrated sensing capabilities for driving the high-side electronic FET switch, comprising:
one input terminal pin for the input signal, fed in from said control and test unit and internally connected to a digital inverter circuit for generating a pair of antiphased input signals, used internally;
one terminal pin for circuit supply voltage;
one terminal pin for circuit ground;
one input terminal pin for an external bias voltage;
two, named first and second, differential switching amplifier stages containing a first pair of transistors of PMOS type, the sources of which are connected together and to a supply voltage, one FET acting as diode the other as resistor biased FET switch; also containing a second pair of transistors of NMOS type, differentially driven by said antiphased input signals, source connected together and to the drain of one commonly used transistor of NMOS type—the source of which is connecting to ground and the gate controlled by said externally supplied bias voltage—and whereby the drains of said second pair of FETs are serially connected to the drains of said first pair of FETs; further containing as booster amplifier a serial circuit of two transistors of PMOS type, source connecting the first FET to a supply voltage, the drain of the second FET connecting to ground and drain to source connected together and delivering thereby a resistor biased output signal;
one auxiliary transistor of NMOS type for delivering an internal supply voltage to said second differential switching amplifier stage;
one internal current source;
one output stage configured as serial circuit of two transistors of PMOS type and said internal current source, with first and second FET, drain to source connected together in a common node and the source of the said first FET connecting to circuit supply voltage, also said internal current source connecting to ground and connected in series with said two transistors and directly wired to the drain of the second FET, further configured with drain of said first FET and source of said second FET connecting to said common drain to source connection node where the internally generated driving signal is generated, whereas the internally generated sensing node signal comes from the connection node between the drain of said second FET and said internal current source;
two output terminal pins connected internally to the drains of said first and second FETs of said output stage and externally connecting respectively to gate and source of said external driven high-side electronic switch FET for said driving and sensing respectively, where said internally generated driving and sensing node signals stem from said respective connection nodes as described above.

23. A circuit, realizing a driver device for secure and reliable firing of an igniter or squib, connecting said squib via an electronic high-side switch to a power source and via an electronic low-side switch to circuit ground, incorporating separate power supply parts for high voltage and low voltage domains and equipped with elaborate intrinsic diagnostic and online testing features for a diagnostics and a firing mode for circuit protection and firing operation securing purposes, comprising:

a control and test unit subdivided into a Firing Control (FC) part and a Diagnostic & Online Testing (DOT) part with one pair of current control signal outputs to said low-side switch and for said diagnostics and said firing modes respectively;

two output terminal pins for external connecting the igniter or squib to said circuit;

a first controllable electronic switch, namely said high-side switch, connecting to one side of said squib and allowing for connecting said squib to said power source for safely performing driver switch diagnostics and a driver switch operation of secure firing when simultaneously closed with said low-side switch;

a second controllable electronic switch, namely said low-side switch, connecting to the other side of said squib and allowing for connecting said squib to circuit ground for safely performing said driver switch diagnostics and said driver switch operation of secure firing when simultaneously closed with said high-side switch;

one input connector pin for connecting an external mechanical safing sensor to said driver device fed by a charge pump which in turn is fed by said power source, which itself is also connected and reverse battery protected by a series power diode and thus serving as main power input terminal and therefore connected to one side of said high-side switch;

one input connector pin for connecting an electronic safing sensor to said control and test unit of said driver device;

one output connector pin for a 'Fuel Cut-Off' signal generated within said Firing Control (FC) part of said control and test unit in case of a firing operation;

one output connector pin for a 'Diagnostic Lamp Driver' signal generated within said Diagnostic & Online Testing (DOT) part of said control and test unit in case of failure detection during normal operation of the circuit;

one first ground pin of the circuit wired to said low-side switch, one second ground pin of the circuit wired to said first ground pin and to said control and test unit, a first controlled current source with a diagnostics current control input for said driver switch diagnostics of said low-side switch and switching on in said current limited diagnostic mode performing low-side switching transistor functions for diagnostics;

a second controlled current source with a firing current control input for said driver switch operation of firing for said low-side switch and switching on in said current limited firing mode performing low-side switching transistor functions for firing;

one low-side current output connecting the current outputs of said first and said second controlled current source as common input to said low-side switch;

one external power-supplying component receiving input from said separate power supply part of said low voltage domain;

one external power supplying component working as charge pump fed by said separate power supply part from said high voltage domain and feeding in diagnostics mode said first controllable electronic switching device, named high-side switch in diagnostics mode and as well feeding an external energy storing device, realized as storage capacitor;

one High Side Driver (HSD) circuit block for driving said high-side switch;

one external power supplying component working as charge pump fed by said separate power supply part from said high voltage domain and feeding said HSD circuit block;

two low-side control signal lines from said current control outputs fed by said control and test unit steering said first controlled current source for said driver switch diagnostics and steering said second controlled current source for said driver switch operation of firing, both current sources used for said low-side switch;

one driver control signal line from said control and test unit input to said HSD circuit block; and four sense signal lines sensing the voltage levels on both sides of said two controllable electronic switches and feeding their signals into said control and test unit in both operating cases: said diagnostic mode and said firing mode.

24. The circuit, according to claim 23 wherein said first controllable electronic switch, named high-side switch is realized by an NMOS-FET switch and driven by said High-Side Driver (HSD) device.

25. The circuit according to claim 24 wherein said High Side Driver (HSD) device is realized as a monolithic integrated circuit.

26. The circuit according to claim 25 wherein said integrated High Side Driver (HSD) circuit comprises multiple FET transistors of NMOS type, multiple FET transistors of PMOS type, a digital inverter circuit for an input signal fed in from said control and test unit for control of said firing, diagnostic and online testing, a current source, and some additional integrated resistors, and whereby external connection pins are used by said input signal, and for connections to supply voltages and GND and for another two output connections for the internally generated driving and sensing node signals connecting to said high-side switch.

27. The circuit according to claim 26 wherein said High Side Driver (HSD) device is realized as a monolithic integrated circuit in CMOS technology.

28. The circuit according to claim 23 wherein second controllable electronic switch, named low-side switch is implemented by two low-side driver NMOS-FETs in current mirror configuration and thus serving as said low-side driver switch.

29. The circuit, according to claim 23 whereby into said high-side switching device of said squib to said power source are combined together: firstly said high-side switching transistor functions for controlled firing operation and for onsite test diagnostics, secondly said controlled firing operation with current limitation and thirdly said onsite test diagnostics.

30. The circuit, according to claim 23 whereby into said low-side switching device of said squib to said circuit ground are combined together: firstly said low-side switching transistor functions for controlled firing operation and for onsite test diagnostics, secondly said controlled firing operation with current limitation and thirdly said onsite test diagnostics.

31. The circuit, according to claim 23 implemented with said HSD controller for said driver switch operation of firing for said high-side switch and with said controllable current source for said low-side switch, both trimmed and setup in such a way, that the control currents for said switches are reduced to a safe minimum for a secure firing operation, thus allowing for the smallest external storage capacitor possible.

32. The circuit according to claim 23 implemented as integrated circuit.

33. The circuit according to claim 23 implemented as integrated circuit in low cost CMOS technology.

34. A method for controlled operation and secure firing of igniters or squibs, capable of driving the necessary switching devices within a circuit branch connecting said squib via a high-side electronic switch to a power source and via a low-side electronic switch to circuit ground, incorporating separate power supply parts for high voltage and low voltage domains and equipped with elaborate intrinsic diagnostic and online testing features for circuit protection and operation securing purposes, altogether named Squib Driver circuit, comprising:

providing a means for providing a Control and Test Unit for said Squib Driver circuit containing a Firing Control (FC) unit and a Diagnostic and Online Test (DOT) unit with input and output connections for an electrical Safing Sensor, a Fuel Cut-Off During Collision operation and a Diagnostic Lamp Driver signal, and further additionally containing measuring or sensing input signals and control output signals;

providing for said Squib Driver circuit means for connecting an external main power supply via a mechanical Safing Sensor and means for connecting to ground;

providing for said Squib Driver circuit external means for providing said power supply using a charge pump circuit for storing the main supply energy within an external storage capacitor as Airbag Voltage Supply AVS voltage;

providing for said Squib Driver circuit connection means for connecting an external igniter device or squib to a first connection pin named high-side connection and to a second connection pin named low-side connection;

providing a first internal means for switching operations of said external igniter device or squib on its high-side connection point, named high-side switching device;

providing a second internal means for switching operations of said external igniter device or squib on its low-side connection point, named low-side switching device;

providing a first internal means for driving said internal high-side switching device, named High-Side Driver (HSD) circuit;

providing other internal means for supplying multiple driver currents to said internal low-side switching device using controllable and switchable current source circuits;

providing means for connection of said measuring or sensing input signals from said high-side and low-side switching devices to said Control and Test Unit;

providing means for connection of said control output signals from said Control and Test Unit to said controllable and switchable current source circuits for said low-side switching device;

implementing said high-side switching device as a single NMOS FET switch transistor;

implementing said low-side switching device with at least a pair of NMOS transistors in current mirror configuration;

implementing said high-side switch driver circuit with at least an integrated HSD circuit, consisting of two anti-phased driven current mirror differential switching amplifier NMOS&PMOS stages each with PMOS output booster circuit and both driving one PMOS output driver stage biased by an internal current source;

implementing for said low-side switching device said controlled pair of switchable current sources as drivers, whereby the one current source defines the normal diagnostic and test operations and the other current source the firing operation;

initiating a Basic Function Test Cycle for said Squib Driver circuit during power on of said Squib Driver circuit, testing regular functionality of said internal driver circuits and switches and said external igniter device or squib;

starting, in normal operation mode, the Diagnostic and Test Cycle for continuous surveillance of prescribed isolation and resistance values of the regular functioning of the system;

testing for isolation values of the high-side and low-side switching devices versus supply voltage and ground;

measuring appropriate test voltages at the squib and said high-side and low-side switching devices in the switched squib branch with at least given diagnostic currents;

calculating the resistance of the squib and said high-side and low-side switching devices in the switched squib branch;

evaluating said measured and calculated values and compare to the prescribed and for a regular operation required and defined values;

activating in case of failure an alarming signal;

calculating with at least said voltage and resistance values secure firing current values for said high-side and said low-side switching devices, thus trimming and selling-up said controlled driving currents to their operational necessary minimum, and thus limiting said main supply energy stored within said external storage capacitor to an optimum;

continuing the Diagnostic and Test Cycle from its starting point above during normal operation of the Squib Driver circuit; and firing the squib in case of emergency by switching on at the same time, both the high-side and the low-side switching devices and whilst observing given current limitations with at least said controlled driving currents.

35. A circuit realizing a driver device for secure and reliable firing of an igniter or squib, comprising:

an external power supply furnishing the main supply energy;

external means for storing said main supply energy within an external storage capacitor;

a high-side switch and a low-side switch connecting said squib to power supply and to ground respectively whereby said low-side switch is implemented with at least a pair of NMOS transistors in current mirror configuration and said high-side switch is using an NMOS FET switch transistor;

a driver circuit for said high-side switch capable of current controlling said high-side switch;

a first controlled current source for diagnostics of said squib and thus enabling to switch on said low-side switch in a current limited diagnostic mode;

a second controlled current source for firing of said squib and thus enabling to switch on said low-side switch in a current controlled firing mode;

a control circuit for diagnostics and firing of said squib capable of evaluating and setting-up the values of said controlled currents to their operational necessary minimum in such a way that a secure firing of said squib is always guaranteed and at the same time limiting said main supply energy stored within said external storage capacitor to an optimum.

36. A method for controlled operation and secure firing of igniters or squibs, comprising:
   providing an external power supply furnishing the main supply energy;
   providing external means for storing said main supply energy within an external storage capacitor;
   providing a high-side and a low-side switching device for connecting said squib to said power supply and ground respectively;
   implementation of said low-side switching device with at least a pair of NMOS transistors in current mirror configuration and of said high-side switching device using an NMOS FET switch transistor;
   implementing for said low-side switching device a current source that defines the normal diagnostic and test operations and another current source defining the firing operation thus in any case delivering controlled driving currents;
   implementing for said high-side switching device an output driver stage biased by an internal current source delivering a controlled driving current; and
   calculating secure firing current values for said high-side and said low-side switching devices, thus trimming, or setting up said controlled driving currents to their operational necessary minimum, and thus limiting said main supply energy stored within said external storage capacitor to an optimum.

* * * * *